March 10, 1959   J. L. SAFFER   2,876,515
SNAP CLIP
Filed June 6, 1956
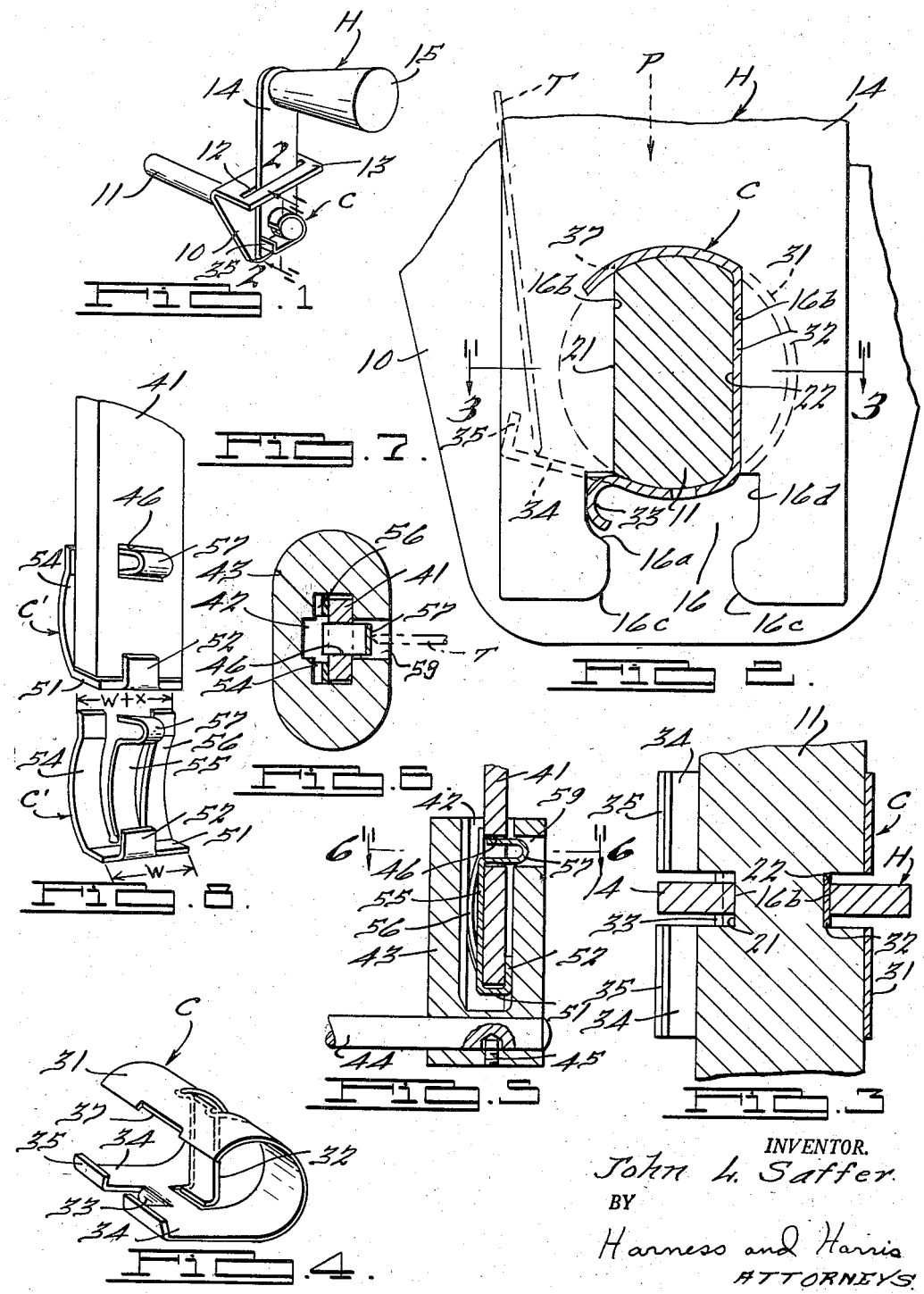
INVENTOR.
John L. Saffer.
BY
Harness and Harris
ATTORNEYS

United States Patent Office 2,876,515
Patented Mar. 10, 1959

2,876,515

SNAP CLIP

John L. Saffer, Madison Heights, Mich., assignor to Chrysler Corporation, Highland Park, Mich., a corporation of Delaware Application June 6, 1956, Serial No. 589,647

5 Claims. (Cl. 24—73)

This invention relates to fastener clips particularly designed to facilitate snap connection of handles or leavers to shafts and the like.

In the two embodiments shown, the two forms of snap clips are used to connect a handle member to an operating shaft although it is obvious that the clip connectors can be used for other purposes. The type of snap clip disclosed is particularly designed for use in so-called blind connections where a notched handle member is inserted through an opening in a panel or the like and snapped into engagement with a concealed shaft. The connection is made by means of a snap clip that is carried by either the concealed shaft or by the notched end of the lever that is concealed behind the panel. This type of clip connector is particularly designed for use in mounting handles or levers on concealed shafting located behind panels of motor vehicle bodies or aircraft bodies. In addition to securely snapping the handle into engagement with the associated operating shaft, this type of clip connector provides concealed but readily operable means to facilitate disengagement of the handle or lever from its associated operating shaft so that the handle or lever may be removed and re-installed without damage to any parts.

It is a primary object of this invention to provide an economical, simple, positive, snap-on connector clip for attaching operators to shafts or the like, the clip including means for readily effecting disengagement of the clip connected members.

It is a further object of this invention to provide a snap-on clip connector that provides not only a positive wedge-type lock for a blind connection but one that includes concealed means for effecting release of the connection if such should be desired.

Other objects and advantages of this invention will become readily apparent from a consideration of the following description and the related drawing wherein:

Fig. 1 is a perspective view of a handle to shaft connection utilizing a clip connector embodying one form of this invention;

Fig. 2 is an enlarged fragmentary sectional elevational view taken along the line 2—2 of Fig. 1 looking in the direction of the arrows;

Fig. 3 is a fragmentary sectional elevational view taken along the line 3—3 of Fig. 2 looking in the direction of the arrows;

Fig. 4 is a perspective view of the clip shown in Figs. 1–3;

Fig. 5 is a sectional elevational view of a clip connector embodying a second form of this invention;

Fig. 6 is a sectional elevational view taken along the line 6—6 of Fig. 5 looking in the direction of the arrows;

Fig. 7 is a perspective view of a lever having the clip shown in Fig. 5 attached thereto; and Fig. 8 is a perspective view of the connector clip shown in Figs. 5–7.

It is quite advantageous in vehicle manufacture to add body hardware, such as handles, control levers, and the like, after the vehicle body has been more or less completely assembled. This is particularly true in the automotive industry where the inside door panels are assembled on the doors pior to mounting of the door and window operating handles and/or levers. It has been common practice to connect the door and window operating handles and/or levers to their operating shafts after the inside door panels have been mounted on the doors. Wedge pins or clips or the like that are concealed by spring supported escutcheon plates have been used for this purpose. The pin-type of connection has certain disadvantages and therefore the clip designs shown in the associated drawing were conceived to provide improved types of connectors for this use. These clips are particularly useful for blind connections but are not necessarily restricted to such use for their structure is advantageous for any type of quick, positive, connection between a handle or lever and an associated operating shaft or link.

Fig. 1 of the drawing shows an inverted L-shaped bracket 10 that journals a shaft 11. Bracket 10 includes a slot 12 in its upper leg 13 that is adapted to receive an oscillatable lever 14. Lever 14 is a part of a handle H that also includes a grip knob 15. The lower end of the handle lever portion 14 is provided with a stepped notch 16 as clearly shown in Fig. 2. Notch 16 has a reduced neck opening to provide the inwardly disposed step-like abutment 16a. Abutment 16a provides a latching means as will be subsequently explained.

Shaft 11 is notched on opposite sides, as shown at 21, 22, at the position where the handle H is to be connected thereto (see Figs. 2 and 3). The notches 21, 22 in the shaft 11 provide a pair of recessed, oppositely disposed, substantially flat torque transmitting portions that are adapted to slidably receive the mating portions 16b of the notched lower end of the handle lever 14.

The clip C that is used to connect the notched handle lever 14 to the notched portions 21, 22 of the shaft 11 is substantially of C-shaped cross sectional configuration. Clip C comprises a main body portion 31 of substantially semi-cylindrical formation that is adapted to fit snugly around the peripheral surface portions of the shaft 11 and to extend axially along opposite sides of the shaft notches 21, 22 (see Fig. 3). Stamped out of the clip body portion 31, intermediate its ends, is a strip 32 that provides a choral portion adapted to seat upon the notch wall 22 of shaft 11. It is thought to be obvious that the face-to-face engagement of the clip strip portion 32 with the shaft notch 22 prevents rotation of the clip C with respect to shaft 11 and also prevents relative movement of the clip C axially along shaft 11. Accordingly the clip C is firmly anchored on the shaft 11 by the strip 32 and by the friction grip of the clip about the peripheral surface of shaft 11.

Diametrically opposite the strip portion 32 of the clip C the body portion 31 of clip C is formed with a reversely bent, semi-cylindrical, tail portion 33. Tail 33 is adapted to provide the means that cooperates with the abutment 16a on the notched handle lever 14 to latch the handle H to the shaft 11 as will be subsequently explained.

The clip body portion 31 is also extended tangentially adjacent one or both sides of the tail portion 33 to provide the fingers 34 that are used to effect release of the handle to shaft connection if such should be neccessary. It will be noted that the fingers 34 each have a right angularly bent upturned flange 35 formed at their outer free ends. The flange 35 facilitate the releasing operation of the clip effected handle-to-shaft connection.

When release tool T is used (see Fig. 2) in the manner shown to depress the clip fingers 34 and thereby bend the tail portion 33 out of engagement with the locking abutment 16a of handle 14 then the handle portion 14 may be separated from the shaft 11.

The top of the body portion 31 of clip C is notched at 37 to provide a groove to receive the notched portion 16 on the lower end of handle lever 14 as the handle lever 14 is pressed into locking engagement with the shaft mounted clip C.

To mount a handle H on a shaft 11 by means of the clip C it will first be assumed that the shaft 11 has been notched to provide the flat-sided, aligned, formations 21, 22. Next clip C will be snapped onto shaft 11 with its strip portion 32 engaging one of the shaft notch flat portions 21 or 22. Handle H, having the notched lever end, is then pressed down (see arrow P, Fig. 2) on the top of the shaft mounted clip C with the opposite sides of the notch 16 in the lower end of the lever 14 passing respectively through the clip notch 37 and the oppositely disposed aligned clip opening formed adjacent the clip strip portion 32. As the sides 16b of the lever notch 16 engage the shaft flat portion 21 and the clip strip portion 32, the handle lever locks the clip C to the shaft 11 and also provides a torque transmitting connection between the lever 14 of handle H and the shaft 11. As the handle lever 14 is pressed downwardly to its limiting position the rounded lower end 16c of the notched lever 14 cams the clip tail portion 33 downwardly so that the lower end of lever 14 may pass by. The inwardly disposed enlargement 16d of notch 16 adjacent the step portion 16a permits the clip tail 33 to snap back into locking disengagement with the step 16a in notched lever 14 and firmly anchors the lever 14 to shaft 11. If one attempts to pull upwardly on the handle H to disengage it from the shaft 11 after the tail 33 has snapped into the notch portion inwardly of the step 16a then the step 16a of lever 14 merely forces the clip tail 33 more firmly into locking engagement with the shaft 11 (see Fig. 2). Clip C cannot rotate on shaft 11 during attempts to disengage the handle H from the shaft 11 because the clip C is locked to the shaft 11 by the lever portion 16b holding the clip flat strip portion 32 against the shaft flat portion 22. It is thought to be obvious that the portion 16d of the slot 16 in lever 14 could be provided with a plurality of abutment steps so that one or more different lever anchoring positions would be available.

To effect disengagement of the handle H from the shaft 11, after the clip C has connected these handle and shaft elements together, it is merely necessary to press a thin elongated tool T, such as a screw driver or knife blade (see Fig. 2), down through the plate slot 12 so that the lower end of the tool T will engage and bend downwardly one or the other of the clip fingers 34. When finger portions 34 of clip C are bent downwardly they also carry the clip tail portion 33, which is attached thereto, downwardly and this disengages the tail 33 from the step 16a in lever notch 16. This then permits the handle H to be readily withdrawn from engagement with the shaft 11. After the handle H has been detached from shaft 11 the tool T may be withdrawn from slot 12 and then fingers 34 and the tail 33 of the clip C will snap back to their normal positions. The material from which clip C is made is sufficiently resilient to permit temporary deformation of the fingers 34 and tail 33 in order to release the engaged lever 14 without causing any permanent deformation or set of clip C. In this manner the clip C can be repeatedly engaged with and disengaged from the lever 14 without damage to either part.

In the form of the invention shown in Figs. 5–8, the connector clip C' is adapted to be mounted on the lower end of slotted lever 41 prior to insertion of the clip and lever 41 into the socket 42 of the shaft mounted socket member 43. Socket member 43 is drivingly connected to its supporting shaft 44 by a set screw 45. As can be readily seen from Figs. 5 and 7, the lower end of lever 41 is pierced by a slot 46. This slot 46 is adapted to receive the locking prong 57 of the clip connector C' hereafter described in detail.

Clip C', which is of substantially C-shaped cross section, comprises a base or body portion 51 having an upturned anchoring finger or flange 52 projecting from one side thereof. Projecting upwardly from the other side of the base or body portion 51 of clip C' are three spring fingers 54, 55 and 56 respectively. Finger 55, the centrally positioned finger, carries a transversely extending, substantially U-shaped, locking prong or abutment 57. Prong 57 extends towards the right side of the clip in the disclosed form. Fingers 54 and 56, the endmost fingers, are substantially identical and these fingers are each bowed outwardly towards the left for a reason that will be explained. From Figs. 5 and 7 it will be noted that the base portion 51 of clip C' with its spaced-apart, upturned, fingers 52 and 54, 55, 56, provides a cap or sleeve for the lower end of the lever 41. Furthermore, the locking prong or abutment member 57, carried by central finger 55, will seat in and project through the slot 46 in the lever 41 so that the clip C' will normally be retained on the lower end of the lever 41. The bight portion of the U-shaped locking prong or abutment 57 extends beyond the side of the lever 41 so that it may be seated in a slot in the socket member 43 to lock the lever 41 in the socket member 43 as hereafter explained.

To use the clip C' shown in Figs. 5–8, it is merely necessary to first seat the lower end of the lever 41 on the upper side of the clip base portion 51 between the fingers 52 and 54–56 with the lever tilted slightly towards the right to avoid the locking prong 57. Next the clip C' is tilted or pressed toward the right to insert the locking prong 57 of clip C' in the lever slot 46. At this point the clip C' is securely fastened to the lever 41 so that the lever 41 and its mounted clip C' may now be inserted into a blind socket such as the socket 42 of the socket member 43. The socket 42 has a width that is just slightly larger than the width W of the base portion 51 of the clip C'. Fingers 54 and 56 of clip C' diverge outwardly from the base 51 so that the overall width of the clip C' at the top of the fingers 54, 56 is greater by an amount X than the width W at the base portion 51. This divergence of the spring fingers 54, 56 permits them to be wedged into the socket 42 and to prevent endwise rocking of the lever 41 in socket 42. Due to the bowing of the spring fingers 54, 56 these fingers also tend to prevent any sidewise movement of the lever 41 in the socket 42. As the lever 41 with its clip C' is forced downwardly into the socket 42 the clip locking prong or abutment 57 will automatically snap into the slot 59 in the socket member 43. This will lock the lever 41 and clip C' to the socket member 43. While the socket member slot 59 is shown as piercing the wall of the socket member, it is thought to be obvious that internal abutments of other types, that do not pierce the wall, could be used to anchor the clip locking prong 57 against movement longitudinally of the socket 42. After the clip locking prong 57 is once seated in the socket member slot 59, then the lever 41 is firmly fixed in the socket 42. To release the lever 41 from the socket 42 it is merely necessary to cam or force the abutment prong 57 backwardly out of slot 59 by the use of a small pointed tool T as shown in Fig. 6.

This invention discloses two forms of clip, one that is intended to be carried by the shaft and another that is intended to be carried by the lever that is to be attached to a shaft. However, each clip operates on the same principle and each is merely a different species of the same invention.

I claim:

1. A clip comprising a substantially semi-cylindrical body portion of resilient material having a depressed flat portion formed to provide a chordal portion adapted to be engaged with a flattened portion of an operated member on which the clip is to be mounted to provide means to prevent relative rotation movement between the clip and the operated member on which it is to be mounted, an abutment member formed along one edge of the clip body portion and resiliently mounted thereon so as to be coplanar with and disposed opposite to the aforesaid depressed chordal portion, said abutment member being arranged to be snapped into engagement with an abutment portion of an operator member to be mounted around and engaged with the operated member on which the clip is to be mounted and with an abutment portion of the member on which the clip is to be mounted.

2. A clip comprising a substantially semi-cylindrical body portion of resilient material having a depressed flat portion formed to provide a chordal portion adapted to be engaged with a flattened portion of an operated member on which the clip is to be mounted to provide means to prevent relative rotational movement between the clip and the operated member on which it is to be mounted, an abutment member formed along one edge of the clip body portion and resiliently mounted thereon so as to be coplanar with and disposed opposite to the aforesaid depressed chordal portion, said abutment member being arranged to be snapped into engagement with an abutment portion of an operator member to be mounted around and engaged with the operated member on which the clip is to be mounted and with an abutment portion of the member on which the clip is to be mounted, said clip body portion having a notch in the edge opposite to the one edge mounting the abutment member with said notch being coplanar with the abutment member.

3. A clip comprising a substantially semi-cylindrical body portion of resilient material having a depressed flat portion formed to provide a chordal portion adapted to be engaged with a flattened portion of an operated member on which the clip is to be mounted to provide means to prevent relative rotational movement between the clip and the operated member on which it is to be mounted, an abutment member formed along one edge of the clip body portion and resiliently mounted thereon so as to be coplanar with and disposed opposite to the aforesaid depressed chordal portion, said abutment member being arranged to be snapped into engagement with an abutment portion of an operator member to be mounted around and engaged with the operated member on which the clip is to be mounted and with an abutment portion of the member on which the clip is to be mounted, said clip body portion having a notch in the edge opposite to the one edge mounting the abutment member with said notch being coplanar with the abutment member, and finger means along the said one edge of the clip to facilitate resilient deflection of the abutment member from its normal position.

4. In combination, a shaft having a pair of oppositely disposed, substantially flat-sided torque transmitting portions, a lever member having a slot in an end thereof adapted to receive the flat sided portions of said shaft, said slot being shaped to provide an abutment portion at a location along its length, and a clip of substantially C-shaped cross section connecting the lever to the shaft having a body portion shaped to matingly surround a major peripheral portion of the shaft member, said clip body portion having a flat portion shaped to seat on one of the flat sided torque transmitting portions of the shaft, a tail portion on the clip body portion that is coplanar with the flat portion and arranged to resiliently resist movement of the lever slotted portion into engagement with the torque transmitting portions of the shaft, said tail portion being adapted to snap into engagement with the abutment portion of the lever slot and with an abutment portion of the shaft to anchor the lever to the shaft, and finger means on the clip to facilitate removal of the tail portion from engagement with the lever slot abutment portion to permit disengagement of the lever from the shaft.

5. In combination, a shaft having a pair of substantially flat-sided torque transmitting portions, a lever member having a slot in an end thereof adapted to receive the flat sided portions of said shaft, said slot being shaped to provide an abutment portion at a location along its length, and a clip connecting the lever to the shaft having a body portion shaped to matingly surround a peripheral surface portion of the shaft member, said clip body portion having a portion shaped to seat on one of the flat sided torque transmitting portions of the shaft to prevent relative rotation therebetween, a tail portion on the clip body portion positioned adjacent to and blocking movement across the other of the flat sided torque transmitting portions of the shaft, said tail portion resiliently resisting movement of the lever slotted portion into engagement with the torque transmitting portions of the shaft, said tail portion being adapted to snap into engagement with the abutment portion of the lever slot and with an abutment portion on said shaft to anchor the lever to the shaft.

References Cited in the file of this patent

UNITED STATES PATENTS

| | | |
|---|---|---|
| 1,954,062 | Walter | Apr. 10, 1934 |
| 2,166,916 | Lombard | July 18, 1939 |
| 2,718,417 | Hansen | Sept. 20, 1955 |